March 7, 1967   N. W. SOLLENBARGER   3,307,825
DUMP VALVE FOR WASHING MACHINES
Filed Nov. 4, 1965   5 Sheets-Sheet 1

INVENTOR.
NEIL W. SOLLENBARGER
BY
Horace B. VanValkenburgh
ATTORNEY

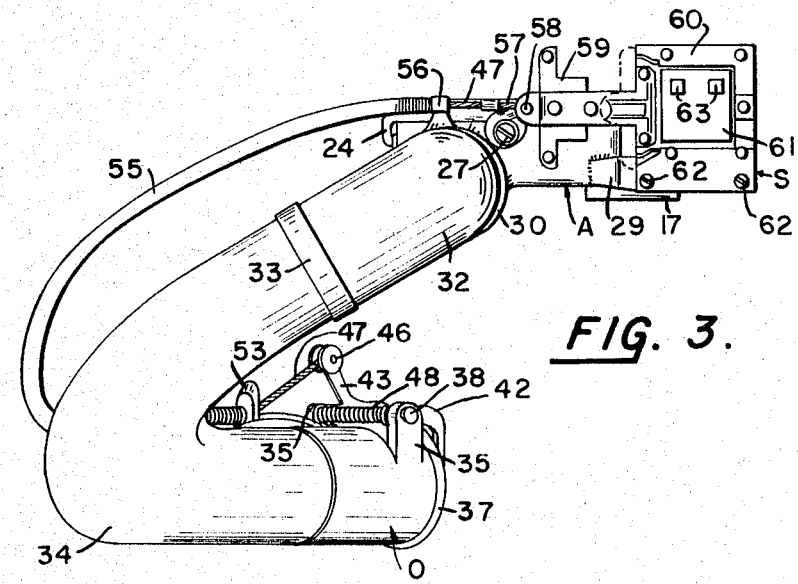

March 7, 1967 N. W. SOLLENBARGER 3,307,825
DUMP VALVE FOR WASHING MACHINES
Filed Nov. 4, 1965 5 Sheets-Sheet 3

INVENTOR.
NEIL W. SOLLENBARGER
BY
Horace B. Van Valkenburgh
ATTORNEY

March 7, 1967  N. W. SOLLENBARGER  3,307,825
DUMP VALVE FOR WASHING MACHINES
Filed Nov. 4, 1965  5 Sheets-Sheet 4

INVENTOR.
NEIL W. SOLLENBARGER
BY
Horace B. Van Valkenburgh

ATTORNEY

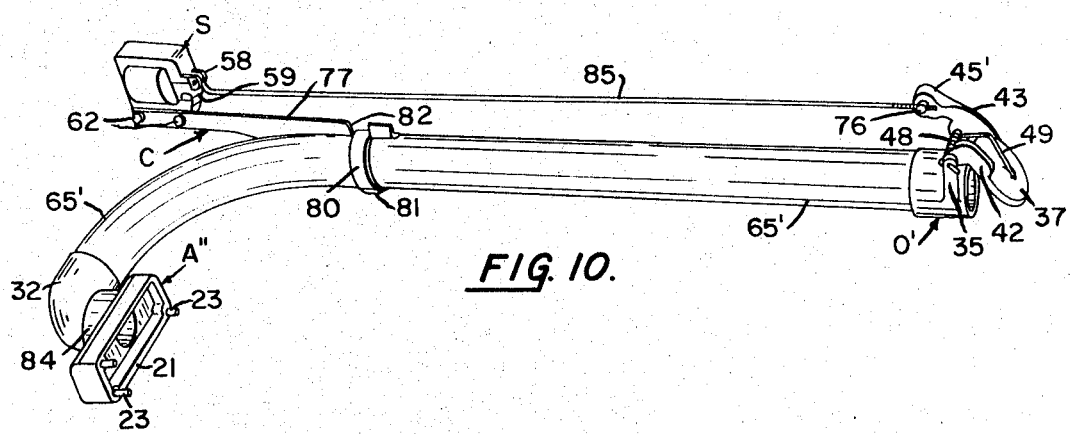
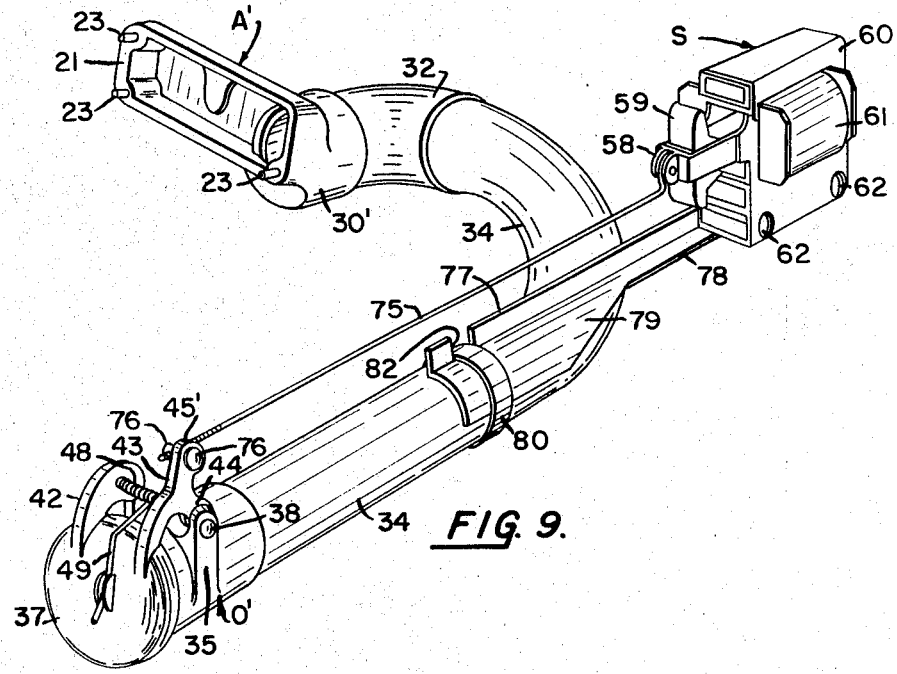

United States Patent Office 3,307,825
Patented Mar. 7, 1967

3,307,825
DUMP VALVE FOR WASHING MACHINES
Neil W. Sollenbarger, 3425 W. 26th Ave.,
Denver, Colo. 80205
Filed Nov. 4, 1965, Ser. No. 513,631
11 Claims. (Cl. 251—138)

This invention relates to a dump valve, and more particularly to a dump valve of the type having a valve, normally a flap valve, at the end of a conduit for discharging water from an automatic washer or washing machine, this application being a continuation-in-part of my prior application Serial No. 202,769, filed June 15, 1962.

Previously, automatic washers have been provided with sump pumps to pump the water from the washer up to a waste line to be carried away. More recently, self-service laundries have utilized dump valves which have been attached to the underside of a washing machine and which include a solenoid operated flap valve at the end of a short conduit projecting rearwardly from underneath the tank of the machine, thereby eliminating the necessity for a sump pump. However, such a dump valve is substituted for the usual lint trap underneath the washing machine and is adaptable only to discharge at the rear of the washer, as into a drain channel, while the solenoid necessarily mounted on the dump valve conduit in a confined location is comparatively inaccessible and in a position to be adversely affected by the water being discharged, for flap valves are notorious for splashing as they open. With the recent advent of drain pans, which support the washers thereabove so that the water from the washers is discharged downwardly into the pan, it is most desirable to provide a dump valve which will discharge the water directly beneath the washer, but which with only a slight modification can be utilized to discharge the drain water at a point rearwardly of the washer.

Among the objects of this invention are to provide a novel dump valve for automatic washers; to provide such a dump valve which advantageously enables the lint trap to be utilized as a sump; to provide such a dump valve in which the solenoid is adequately supported, is remote from the actual discharge opening and is easily accessible at the front of the machine for installation and maintenance; to provide such a dump valve which, in one embodiment, discharges the water to a trough or drain pan below the washer; to provide such a dump valve which, in another embodiment, discharges behind the washer; to provide such a dump valve which is especially easy to install; and to provide such a dump valve which is simple in construction, yet efficient in operation.

Another object of the invention is to provide a further modified arrangement of a dump valve, wherein the solenoid is advantageously located at the front of the machine remote from the flap valve at the discharge end, yet in an alignment which permits a simple, direct and maintenance free linkage connecting the solenoid with the flap valve at the rearward discharge end of the conduit; and to provide such a modified arrangement which may either be an embodiment which discharges below the washer or an embodiment which discharges behind the washer.

Additional objects and the novel features of this invention will become apparent from the description which follows, taken in conjunction with the accompanying drawings, in which:

FIG. 3 is an end elevation of the dump valve and sump of FIG. 2;

FIG. 4 is a side elevation of the dump valve and sump of FIG. 2;

FIG. 9 is a perspective view of a dump valve similar to that shown in FIG. 2, but with an alternative mounting of the solenoid; and FIG. 10 is a perspective view, of a dump valve similar to that shown in FIG. 8, but with an alternative mounting of the solenoid.

Figure 1:
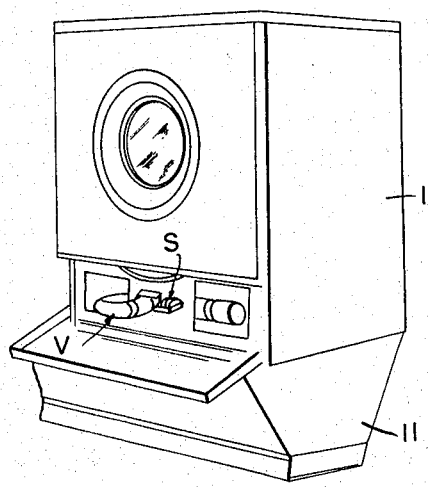
FIG. 1 is a perspective view of an automatic washing machine in which is installed a novel dump valve of this invention.
Figure 2:
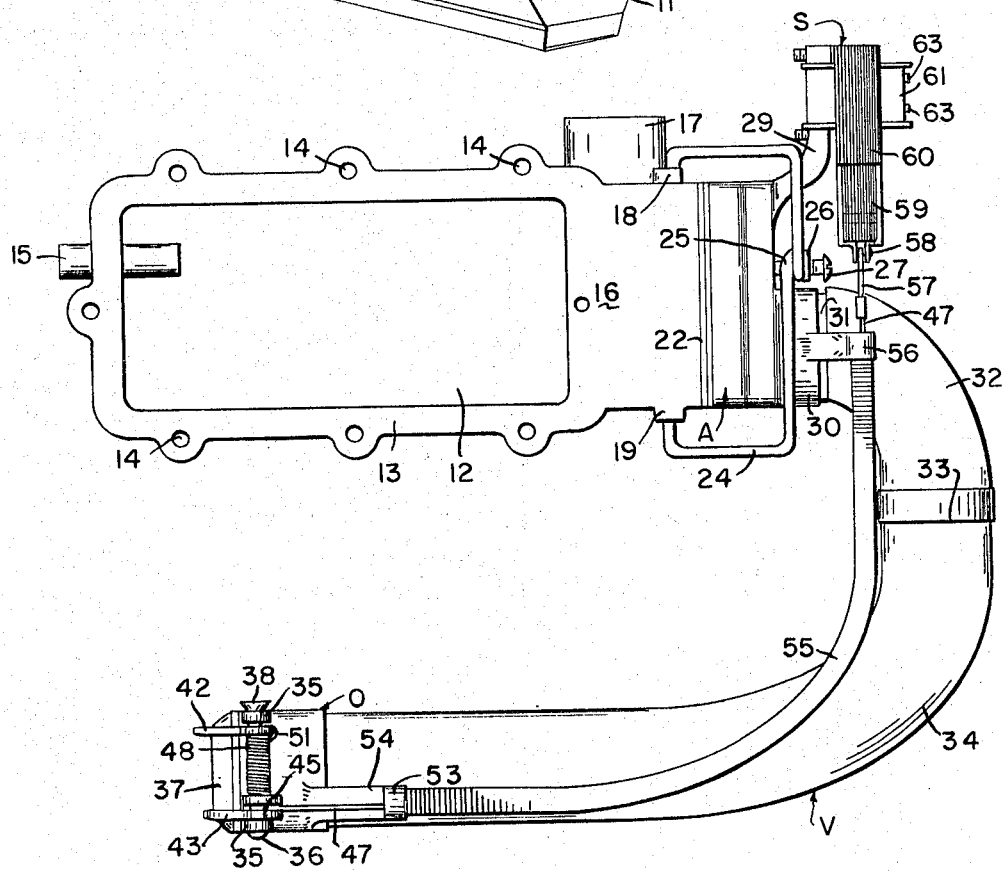
FIG. 2 is a top plan view of the dump valve attached to a lint trap converted to a sump of the washing machine of FIG. 1.

In accordance with this invention, a novel dump valve V is connected to the bottom of an automatic washer 10 which may conveniently be mounted on a drain pan 11, such as that disclosed in the application of Bertice A. Martin and Volker W. H. Rassbach, Serial No. 194,145, entitled, "Base for Washing Machines," now U.S. Patent No. 3,186,427. Normally, the washer is provided with a lint trap, which is easily accessible from the front of the washing machine. In accordance with this invention, the lint trap is converted into a sump, through removal of the usual screen therein and other slight modifications herein described. The lint trap screen reduces the flow and ads considerably to the discharge time, particularly when lint or other objects collect therein, such objects being caught by the screen to prevent damage to the pump, but the screen is eliminated by use of the dump valve of the present invention. Thus, the lint trap, converted to a sump 12, may comprise a generally rectangular pan, such as an aluminum casting, having a peripheral flange 13 around the upper edge thereof for attachment around the lower edge of a drain opening in the washer, as by cap screws extending through a plurality of spaced holes 14 in flange 13. A tube 15 extends through one end wall of pan 12, the outer end of which may be connected to a hose extending to a pressure-sensitive switch, for cutting off the water supply to the machine when it reaches a desired level. A neck 16 extends from the opposite end of the sump, at the front of the washing machine, and is provided with an outlet 17 in one side thereof, which is normally connected by a hose to a sump pump, for pumping the water from the washer. The base end of neck 16, at the front of the machine, is open to form a mouth and is normally covered by a lint cover plate (not shown) which is provided with a screen adapted to extend longitudinally along the upper portion of pan 12 to a point adjacent tube 15. Thus, as the water descends into pan 12 and drains through outlet 17, lint is deposited on the screen and must periodically be cleaned by removing the lint cover for this purpose. The lint cover is normally held in place by means of a wire bail (not shown) whose ends extend into holes in nibs 18 and 19 provided on opposite sides of neck 16, as shown in FIG. 2. The lint cover may be removed and discarded, when the dump valve V is installed, so that the lint trap may be converted into a sump, on which the dump valve is mounted. Also, outlet 17 is plugged, as by an expandable rubber plug 20 of FIG. 7. The sump pump and its flow control valve, which controls the flow of water from outlet 17 to the sump pump, are also preferably removed from the washer, while a solenoid which normally controls the valve controlling flow to the sump pump, can be used as part of the dump valve, such as solenoid S of FIG. 2, without significant changes to the conventional control wire hookup in the machine. This lint trap of the washer thus modified is a comparatively rigid, strong member securely attached to the tank of the washing machine and serves as a rugged abutment on which the dump valve V may be mounted.

Figure 5:
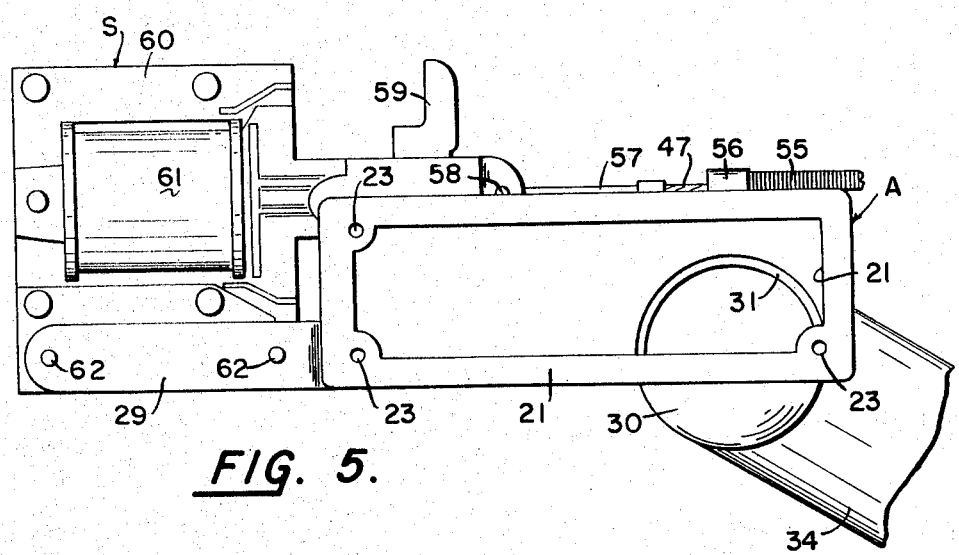
FIG. 5 is a fragmentary end elevation of the dump valve of FIG. 2, looking toward the mouth which engages the sump.

Dump valse V is provided with a mouth attachment A having an inlet opening 21 at one end thereof, as in FIG. 5, which has the same size and configuration as the base end of neck 16 and abuts against a pair of rectangular sealing rings 22, positioned therebetween and formed of rubber or other suitable material. Conveniently, the attachment A is provided with three pins 23, around mouth 21, as in FIG. 5, two of which extend from the lower corners and the third extending from the upper inner corner, as shown in FIG. 5, for engaging the inside corners of the mouth in the base end of neck 16, to center the mouth attachment therein. Pins 23 also conveniently extend through holes in sealing rings 22, which are conveniently formed with inwardly extending corners to provide an area for the holes. Attachment A is held in position by a wire bracket or bail 24, having ends which extend into the holes in nibs 18 and 19 and a central loop 25 which extends around and clamps an internally threaded collar 26, through which a tightening screw 27 extends. The inner end of screw 27 engages the rear surface at inlet 21 to hold the dump valve in a fixed position. By turning the screw in a clockwise direction, the collar will be moved outwardly, thereby applying tension to bracket 24, to clamp the dump valve against neck 16. The inner end of screw 27 may be beveled and a dimple or depression formed in the rear surface of mouth attachment A for engagement by the inner end of the screw.

Figure 7:
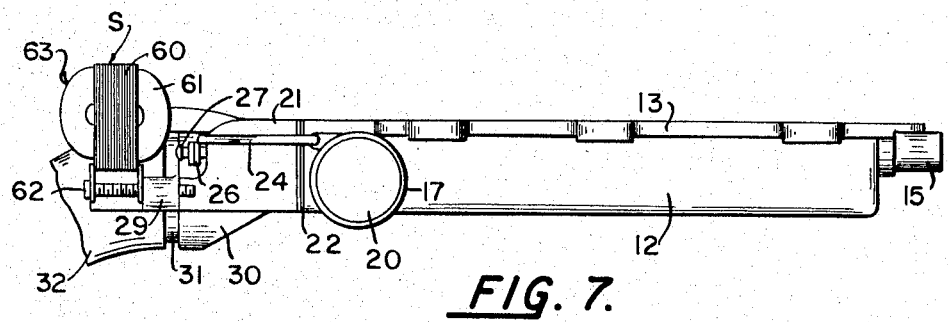
FIG. 7 is a fragmentary side elevation of the dump valve, attached to the sump, looking from the opposite direction from that of FIG. 4.

Solenoid S may be mounted on an arm 29 extending laterally and forwardly from one end of attachment A, as shown in FIGS. 2, 5 and 7. The solenoid S is used for operating the dump valve gate in a manner to be described. Adjacent its opposite end and on the opposite side from mouth 21, attachment A is provided with a downwardly offset outlet 30, which is circular to receive a nipple 31 for attachment of an elbow 32, as by brazing or soldering. As in FIGS. 2 and 4, the opposite end of elbow 32 is provided with a flange 33 for receiving the end of a curved waste pipe 34, on the opposite discharge end of which is mounted an outlet fitting O. Pipe 34 curves around to extend rearwardly and generally parallel to pan 12, as in FIG. 2, but downwardly therefrom, as in FIG. 4. Thus, the conduit of the dump valve extends from the outer face of the attachment A to turn to one side of the sump and to extend rearwardly from the sump to dump into a drain below or behind the washer, as will be further described. For the more common sizes of automatic washers, pipe 34 may be 1½ inches in inside diameter, which will provide substantially complete drainage in a short time, although other sizes may be utilized. It will be understood that the drainage time depends upon the amount of clothing in the machine, since all of the water cannot be drained until it has been removed from the clothing, as by spinning. Conveniently, elbow 32, pipe 34 and discharge fitting O may be attached to each other by brazing or soldering.

Figure 6:
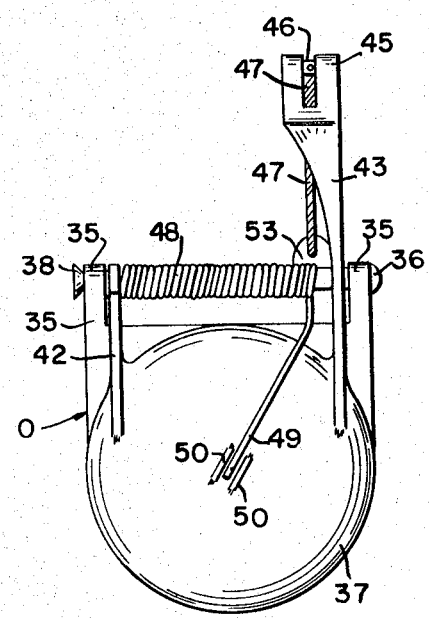
FIG. 6 is an end elevation of the valve gate of the dump valve.

Discharge fitting O is provided with a pair of spaced, upstanding ears 35, as seen in FIGS. 2 and 6, through which a pin 36 extends for pivotally supporting a flap valve gate 37. One end of pin 36 may have a head and the other end 38 may be swaged, as best seen in FIG. 6, to retain pin 36 in position. Valve gate 37 is provided with a rubber seal 40 on the inner face thereof, as in FIG. 4, adapted to seal against the end of discharge fitting O, to prevent the discharge of water from pipe 34 when valve gate 37 is closed. Valve gate 37 is pivoted on pin 36 by means of a shorter angular arm 42 and a longer arm 43 having a rearwardly extending ear 44, arms 42 and 43 having holes through which pin 36 extends. The extreme upper end 45 of arm 43 is enlarged and bifurcated, having a slot through which a transverse pin 46 extends for attachment of the outer end of a flexible cable 47. Valve gate 37 is normally held in closed position by a coil spring 48, or in any other suitable manner. Spring 48 is coiled around pin 36 and one end 49 extends between a pair of spaced ribs 50, as in FIG. 6, on valve gate 37, for urging it to a closed position, while the other end 51 is anchored, as by extending downwardly behind arm 42, as shown in FIGS. 2 and 4.

Advantageously, cable 47 extends through a guide 53, mounted on an arm 54 attached to or integral with discharge fitting O, while cable 47 moves in a flexible sheath 55, the outer, rearward end of which is attached to guide 53, the latter having an upwardly extending hole therethrough to insure that cable 47 will not bind during movement. The inner, forward end of sheath 55 is connected to an arm 56 which is mounted on or integral with attachment A and extends forwardly over L 32. The inner end of cable 47 is conveniently provided with a hook 57 which connects the cable to a pin 58 attached to the end of a movable, laminated core 59 of solenoid S, as in FIG. 2. The solenoid has a laminated armature 60 within which is disposed a coil 61 and the lower end of which is mounted on arm 29 of FIG. 2, as by screws 62 of FIGS. 3, 5 and 7. Coil 61 is provided with contacts 63, so that the solenoid may be connected in the control circuit of the washing machine. Thus, when the washer reaches the end of a washing or rinsing cycle, coil 61 of solenoid S will be energized so that core 59 is pulled into the coil, i.e. from the full to the dotted position of FIG. 3, thereby causing cable 47 to open valve gate 37, as in FIG. 4. Likewise, upon deenergization of coil 61 of solenoid S, spring 48 will urge valve gate 37 to closed position, causing core 59, through cable 47, to be pulled outwardly from coil 61.

Figure 8:
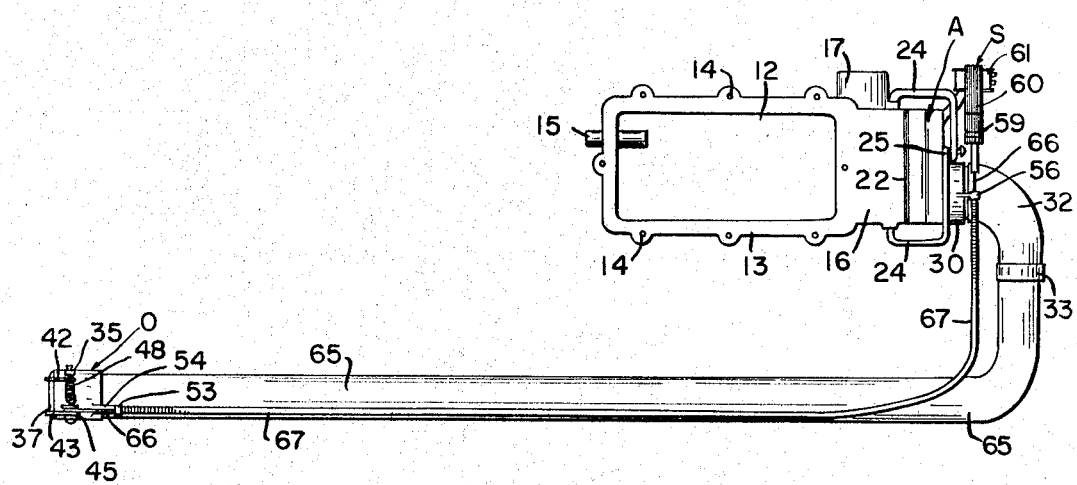
FIG. 8 is a top plan view, similar to FIG. 2, showing an alternative dump valve adapted to discharge waste water at a greater distance to the rear.

The alternative dump valve shown in FIG. 8 is adapted to be utilized in an installation where the drain trough or drain connection is located behind the washer. Except for a longer pipe 65, which otherwise corresponds to pipe 34 of the form just described, and a longer cable 66 and flexible sheath 67, which correspond to cable 47 and sheath 55 of the form just described, substantially identical parts may be used. Although pipe 65 is shown in FIG. 8 as turning through 90° and then extending parallel to pan 12, similar to pipe 34 as shown in FIG. 2, it will be understood that pipe 65 of FIG. 8 will also extend downwardly, though perhaps at a lesser angle than pipe 34, as shown in FIG. 4. Thus, an outlet fitting O is attached to the outer end of pipe 65 and is provided with a valve gate 37 normally held closed by a spring 48 and adapted to be opened by the pull of flexible cable 66 attached to the upper end 45 of a longer arm 43 of the valve gate. Also, flexible sheath 67 is attached at its outer end to guide 53, supported by arm 54 of outlet fitting O, while the inner end of sheath 67 is attached to arm 56 of attachment A and the inner end of flexible cable 66 is attached to core 59 of solenoid S, mounted as before on an arm 29 of attachment A. As before, attachment A is mounted on pan 12, being held in position by bail 24 and an associated screw. Other parts having the same reference numbers correspond to parts described previously. At the end of a washing or rinsing cycle, solenoid S may be energized through a suitable electrical circuit connected to coil 61 at contacts 63, to cause core 59 to be pulled into coil 61 and pull cable 66, so that valve gate 37 is pulled open against the force of spring 48. After the water has drained from the washer, solenoid S will be deenergized, so that valve gate 37 will be urged to closed position by spring 48, thereby pulling core 59 outwardly from coil 61 and to the position shown in FIG. 8.

The alternative embodiment shown in FIG. 9, which is similar to that shown in FIG. 2, includes a rigid pull rod 75, which connects the valve gate 37 of a modified discharge fitting O' with the core 59 of solenoid S. In this arrangement, the solenoid S is carried upon the arm C which cantilevers forwardly from the curve of the outlet pipe to dispose the solenoid forwardly of an attachment A', and also above the outlet pipe at an easily accessible location at the front of the washing machine. This arrangement permits the solenoid to be aligned with the discharge portion of the outlet pipe and is especially desirable at installations where atmospheric conditions, whether natural or induced, tend to cause the cable 47 of FIG. 2 to corrode and bind in its sheath 55.

In the embodiment of FIG. 9, the attachment A' is modified primarily by the elimination of the solenoid supporting arm 29 and the sheath supporting arm 56 of FIG. 2, heretofore described. The downwardly offset outlet 30' is adapted to receive the elbow 32, while elbow 32 receives the curved waste pipe 34, as heretofore described. The rear end of the pipe 34 carries a discharge fitting O', which is similar to the fitting O of FIG. 2, except that the arm 54 and its guide 53, of FIG. 3, are eliminated, as well as the cable 47 and its sheath 55. In lieu thereof, rod 75 has one end connected with the pin 58 on the core 59 of solenoid S, and the other end threaded and adjustably connected with a pin 76 having a threaded, transverse bore and received in the upper end 45' of arm 43' of fitting O'. As before, the extended end 49 of a coil spring 48, surrounding pivot pin 38 for valve gate 37, holds valve gate 37 closed unless opened by actuation of solenoid S. Other parts, having the same reference numerals, correspond to those shown in FIGS. 2 and 3 and heretofore described. As will be evident, the solenoid is mounted forwardly of the mouth attachment A and at a level sufficient to avoid splashing thereon, such as above the level of the outlet.

The solenoid supporting arm C is formed as an angle having an upstanding flange 77 and a lateral flange 78. The rearward end of arm C, that is, the end towards the discharge end of pipe 34, is adapted to rest upon the straight portion of the rearwardly extending pipe 34 adjacent to the turn into elbow 32 at its forward end. To provide a snug, solid fit of this arm upon the pipe, the lateral flange widens at its rearward end and arches downwardly to provide a partially circular sleeve 79 nesting against the pipe 34. Arm C is secured in position in any suitable manner, as by strap 80 tightened by a clamp 81, as in FIG. 10, to tightly embrace the pipe 34 and sleeve 79 upon it. A notch 82 is provided in the upstanding flange 77 to accommodate strap 80. Clamp 81 may be of the "Band-It" type; however, other types of clamps will function equally as well. To complete the unit, the solenoid S is mounted upon the forward, cantilevered end of arm C by the mounting screws 62.

The embodiment of FIG. 10 is particularly adapted to discharge waste from the rear end of a pipe 65', similar to pipe 65 of FIG. 8, but having a greater radius of curvature at the front end, the discharge at the rear of the washer being controlled by valve gate 37. This embodiment differs from the construction shown in FIG. 8 in essentially the same manner as the embodiment of FIG. 9 differs from FIG. 2, except that outlet 84 of attachment A'' is centrally located. Pull rod 85 is longer than pull rod 75, to accommodate the difference in length between pipe 65' and pipe 34. The outlet O' is the same as that described above in connection with FIG. 9, while supporting arm C is mounted on the forward end of the pipe 65' to extend forwardly of the front curved portion of the pipe, precisely the same as above described, to dispose the solenoid forwardly of attachment A'' and at a level sufficient to avoid splashing thereon.

It will be evident that, in each of the embodiments shown, the solenoid S is mounted at a position remote from gate valve 37, so that splashing drainage water is unlikely to reach the solenoid. Thus, the solenoid position avoids the deleterious effects of water splashing thereon. Also, in the preferred position above an arm which is forwardly of the curved portion of the conduit of the dump valve, there is still less likelihood of water splashing on the solenoid, or moisture unduly affecting the same. It will also be noted that the pipes 34 of FIGS. 2 and 9, or pipes 65 or 65' of FIGS. 8 and 10, illustrated as being curved on a 90-degree curve, may be curved or bent to any desired configuration to correspond to the openings in the frame of the washer in which installed.

From the foregoing, it is readily apparent that a dump valve constructed in accordance with this invention fulfills to a marked degree the requirements and objects hereinbefore set forth. A dump valve has been provided which replaces the lint cover on the lint trap, converted to a sump for the washer, and may be operated by a solenoid which was formerly used for control of flow to the sump pump, which is eliminated. In addition, the valve gate is located at the discharge end of a waste pipe and is remote from the solenoid and therefore, the tendency for water being discharged to splash on the solenoid is avoided. Also, the valve gate is readily controlled by a cable or a pull rod extending from the valve gate to the solenoid. In one embodiment, a dump valve is shown having a relatively short waste pipe, for discharging the water from the washer into a drain pan or the like under the washer, while in another embodiment, a relatively long waste pipe is provided for discharging the water into a trough or the like located at the rear of the washer. Aside from the waste pipe and the flexible cable and sheath therefor, or the pull rod in lieu of a cable and sheath, the same parts may be utilized, so that the device of this invention is readily adaptable to different installations. Also, it is readily apparent that the dump valve may be installed on a washer with a minimum of effort required, since the same or a similar lint trap may be utilized to provide a sump and the bail utilized in attaching the dump valve is connected to the sump in the same manner as the bail formerly used to connect the cover to the lint trap. Since the solenoid is positive in operation and the distance which the solenoid core moves is not critical, the movement of the valve gate will be positive. Due to the flexible sheath for the flexible cable and the guide aperture which extends toward the operating arm for the valve gate, there is little likelihood of difficulty in the cable movement. Such likelihood of difficulty is completely eliminated when the pull rod arrangement of FIGS. 9 and 10 is used. Thus, it is apparent that the dump valve is of simple construction, yet highly efficient in operation.

Although several preferred embodiments of this invention have been illustrated and described, it will be understood that other embodiments may exist and various changes and variations may be made without departing from the spirit and scope of this invention.

What is claimed is:
1. A dump valve for use on an automatic washer having a sump, including:
   a mouth attachment adapted to be connected to a mouth of the sump and having an outlet;
   a waste conveying conduit connected to said outlet, turning and extending generally rearwardly and downwardly and to one side of said sump a distance sufficient to minimize splashing, due to discharge from the conduit exit, extending to said sump mouth and to positions forwardly thereof adjacent or above the level of said sump;
   a valve gate mounted at the exit end of said conduit;
   a solenoid mounted forwardly of said mouth and at a level sufficient to avoid splashing thereon; and
   means operatively connecting said solenoid to said valve gate so that the valve gate will be opened upon energization of said solenoid.
2. A dump valve for use on an automatic washer having a sump as defined in claim 1, wherein:
   said solenoid is mounted on an arm secured to said waste conveying conduit and extending forwardly thereof.

3. A dump valve for use on an automatic washer having a sump, as defined in claim 2, wherein said arm comprises:

an angle bracket, one side of which has a portion of enlarged width shaped to fit against said waste conduit; and a strap extending around said waste conduit and said enlarged width portion of said angle bracket for clamping said bracket against said conduit, the other side of said bracket having a notch to accommodate said strap.

4. A dump valve for use on an automatic washer having a sump, as defined in claim 1, wherein:

said solenoid is mounted on a bracket secured to said mouth attachment, on the opposite side of said mouth attachment from said waste conduit.

5. A dump valve for use on an automatic washer, as set forth in claim 1, wherein said waste conveying means includes an elbow attached to said outlet; and a curved waste pipe attached to said elbow and extending away from said mouth attachment.

6. A dump valve for an automatic washer, as set forth in claim 1, including:

a bail for connecting said mouth attachment to said sump;

a collar mounted centrally of said bail; and a screw extending through said collar and adapted to engage said mouth attachment for securing said attachment to said sump upon tightening of said screw.

7. A dump valve for use on an automatic washer having a sump, including:

a mouth attachment adapted to be connected to an opening in said sump;

an outlet in said mouth attachment;

waste conveying means connected to said outlet and extending to one side of said mouth a distance sufficient to minimize splashing at said outlet due to discharge from said waste means;

a valve gate mounted at the outer end of said waste conveying means;

a solenoid mounted adjacent said mouth attachment on the opposite side thereof from the direction in which said waste means extends; and means operatively connecting said solenoid to said valve gate, so that said valve gate will be opened upon energization of said solenoid.

8. A dump valve for an automatic washer, as set forth in claim 7, wherein said connecting means includes a flexible cable having one end attached to said solenoid and the other end attached to said valve gate.

9. A dump valve for an automatic washer, as set forth in claim 8, including:

a cable guide at the outer end of said waste means;

a bracket connected to said mouth attachment; and a flexible sheath surrounding said cable and extending between said guide and said bracket.

10. A dump valve for an automatic washer, as set forth in claim 8, including:

an outlet fitting at the outer end of said waste means and having an outlet adapted to be closed by said valve gate;

a pair of spaced ears extending upwardly from said fitting;

a pin extending between said ears, said valve gate having arms pivoting said valve gate on said pin;

a spring normally urging said valve gate to closed position; and an extension on one of said arms operatively connected to said cable.

11. A dump valve for an automatic washer, as set forth in claim 8, including:

an outlet fitting at the outer end of said waste pipe; and a cable guide connected to said fitting and having a hole through which said cable extends, said valve gate being provided with an upwardly extending arm to the upper end of which said cable is connected and said hole in said guide extending upwardly in a direction toward the upper end of said arm.

References Cited by the Examiner

UNITED STATES PATENTS

| | | | |
|---|---|---|---|
| 1,957,736 | 5/1934 | Strehler | 137—351 |
| 2,008,835 | 7/1935 | Rawcliffe | 251—147 X |
| 2,450,195 | 9/1948 | Grantham | 285—181 X |
| 2,657,705 | 11/1953 | Gerhard et al. | 251—294 X |
| 2,987,905 | 6/1961 | Braun | 68—208 |
| 3,036,541 | 5/1962 | Musick et al. | 251—138 X |

M. CARY NELSON, *Primary Examiner.*

R. C. MILLER, *Assistant Examiner.*